(12) United States Patent
Boley

(10) Patent No.: US 11,575,828 B1
(45) Date of Patent: Feb. 7, 2023

(54) DYNAMICALLY IDENTIFYING VISUAL MEDIA CAPTURE FORMATS BASED UPON CONDITIONS

(71) Applicant: Meta Platforms, Inc., Menlo Park, CA (US)

(72) Inventor: Jesse Leon Boley, San Jose, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/501,870

(22) Filed: Oct. 14, 2021

(51) Int. Cl.
*H04N 5/232* (2006.01)

(52) U.S. Cl.
CPC .............................. *H04N 5/23222* (2013.01)

(58) Field of Classification Search
None
See application file for complete search history.

(56) References Cited

U.S. PATENT DOCUMENTS

| 8,904,963 B2 * | 12/2014 | Dixon | A01K 1/0155 |
| | | | 119/173 |
| 11,122,199 B2 * | 9/2021 | Saraya | H04N 5/23227 |

* cited by examiner

*Primary Examiner* — Ahmed A Berhan
(74) *Attorney, Agent, or Firm* — McDermott Will & Emery LLP

(57) ABSTRACT

Methods, systems, and storage media for dynamically identifying visual media capture formats based upon at least one of capture device, resultant visual medium, and/or application-supported conditions are disclosed. Exemplary implementations may: query a visual media capture device for at least a portion of the device-supported visual media capture formats; receive information regarding one or more capture device, resultant visual medium, and/or application-supported conditions relevant to capture of a resultant visual medium; execute an ordered plurality of rules to dynamically identify one or more device-supported visual media capture formats of the device-supported visual media capture formats that is configured to optimize the resultant visual medium; and cause the visual media capture device to initiate capture of the resultant visual medium using one of the identified device-supported visual media capture formats.

20 Claims, 4 Drawing Sheets

DYNAMICALLY IDENTIFYING VISUAL MEDIA CAPTURE FORMATS BASED UPON CONDITIONS

TECHNICAL FIELD

The present disclosure generally relates to capturing visual media. More particularly, the present disclosure relates to dynamically identifying a visual media capture format configured to optimize a visual medium based upon capture device, resultant visual medium, and/or application-supported conditions.

BACKGROUND

When configuring the camera(s) on a mobile device, there are a number of different capture formats that may be selected. Additionally, different visual media capture devices have different capture formats available depending on the capabilities of the device hardware. Due to the number of options that may be available, and the manual examination that may be required to insure optimization of a visual medium in a variety of different circumstances, developers often opt not to look at all of the available formats and instead just select one of the preset formats, for instance, optimizing for still photographs or optimizing for video having a particular format.

BRIEF SUMMARY

The subject disclosure provides for systems and methods for dynamically identifying a visual media capture format configured to optimize a resultant visual medium based upon capture device, resultant visual medium, and/or application-supported conditions.

One aspect of the present disclosure relates to a method for dynamically identifying a visual media capture format configured to optimize a resultant visual medium based upon capture device, resultant visual medium, and/or application-supported conditions. The method may include querying a visual media capture device for at least a portion of the device-supported visual media capture formats. The method may include receiving information regarding one or more capture device, resultant visual medium, and/or application-supported conditions relevant to capture of the resultant visual medium. The method may include executing an ordered plurality of rules to dynamically identify one or more visual media capture formats of the device-supported visual media capture formats, the identified one or more device-supported visual media capture formats being configured to optimize the resultant visual medium. The method may include causing the visual media capture device to initiate capture of the resultant visual medium using one of the one or more identified device-supported visual media capture formats.

Another aspect of the present disclosure relates to a system configured for dynamically identifying a visual media capture format configured to optimize a resultant visual medium based upon capture device, resultant visual medium, and/or application-supported conditions. The system may include one or more hardware processors configured by machine-readable instructions. The processor(s) may be configured to query a visual media capture device for at least a portion of the device-supported visual media capture formats. The processor(s) may be configured to receive information regarding one or more capture device, resultant visual medium, and/or application-supported conditions relevant to capture of the resultant visual medium. The processor(s) may be configured to execute an ordered plurality of rules to dynamically identify one or more device-supported visual media capture formats of the device-supported visual media capture formats, the identified one or more device-supported visual media capture formats being configured to optimize the resultant visual medium. The processor(s) may be configured to cause the visual media capture device to initiate capture of the resultant visual medium using one of the one or more identified device-supported visual media capture formats.

Yet another aspect of the present disclosure relates to a non-transient computer-readable storage medium having instructions embodied thereon, the instructions being executable by one or more processors to perform a method for dynamically identifying a visual media capture format configured to optimize a resultant visual medium based upon capture device, resultant visual medium and/or application-supported conditions. The method may include querying a visual media capture device for device-supported visual media capture formats. The method may include receiving information regarding one or more capture device, resultant visual medium and/or application-supported conditions relevant to capture of the resultant visual medium. The method may include executing an ordered plurality of rules to dynamically identify one or more device-supported visual media capture formats of the device-supported visual media capture formats, the identified one or more device-supported visual media capture formats being configured to optimize the resultant visual medium. The method may include causing the visual media capture device to initiate capture of the resultant visual medium using one of the one or more identified device-supported visual media capture formats.

Still another aspect of the present disclosure relates to a system configured for dynamically identifying a visual media capture format configured to optimize a resultant visual medium based upon capture device, resultant visual medium, and/or application-supported conditions. The system may include means for querying a visual media capture device for at least a portion of the device-supported visual media capture formats. The system may include means for receiving information regarding one or more capture device, resultant visual medium, and/or application-supported conditions relevant to capture of the resultant visual medium. The system may include means for executing an ordered plurality of rules to dynamically identify one or more device-supported visual media capture formats of the device-supported visual media capture formats, the identified one or more device-supported visual media capture formats being configured to optimize the resultant visual medium. The system may include means for causing the visual media capture device to initiate capture of the resultant visual medium using one of the one or more identified device-supported visual media capture formats.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

When configuring the camera(s) on a mobile device, there are a number of different capture formats that may be selected. Additionally, different visual media capture devices have different capture formats available depending on the capabilities of the device hardware. Due to the number of options that may be available, and the manual examination that may be required to insure optimization of a resultant visual medium in a variety of different circumstances, developers often opt not to look at all of the available formats and instead just select one of the presets, for instance, optimizing for still photographs or optimizing for video having a particular format. While this approach optimizes visual media in a number of commonly-occurring scenarios in which a user may be engaged, it does not take into account optimization on a use-case by use-case basis, nor does it take into account visual media capture device conditions such as memory, when determining a visual media capture format to use.

The subject disclosure provides for systems and methods for dynamically identifying device-supported visual media capture formats configured to optimize a resultant visual medium based upon capture device, resultant visual medium and/or application-supported conditions. As utilized herein, the term "dynamically" refers to actions taken by a system of the present disclosure in real-time and without manual user intervention, that is, "behind-the-scenes".

Figure 1:
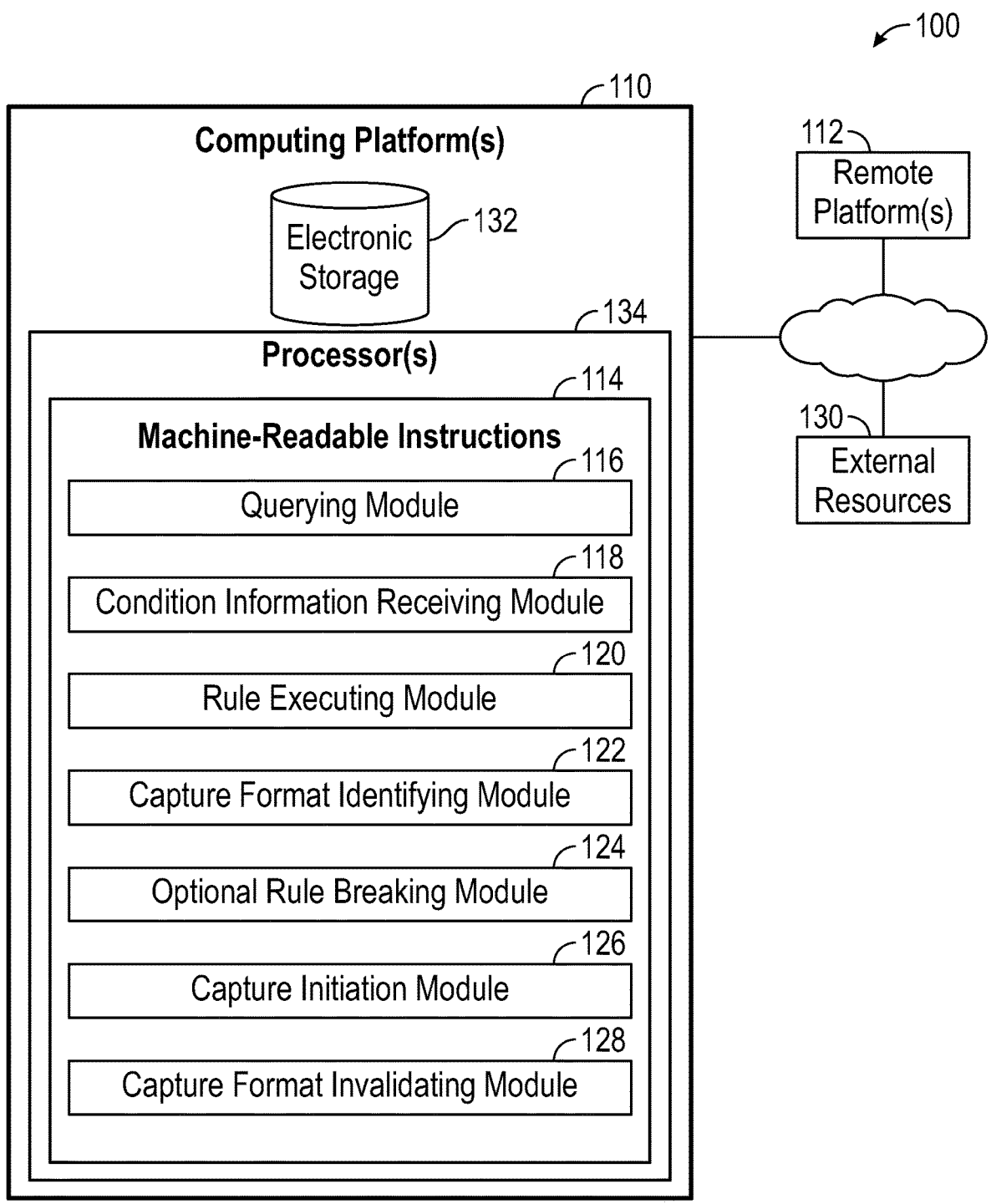
FIG. 1 illustrates a system configured for dynamically identifying visual media capture formats configured to optimize a resultant visual medium based upon capture device, resultant visual medium, and/or application-supported conditions, in accordance with one or more implementations.

FIG. 1 illustrates a system 100 configured for dynamically identifying device-supported visual media capture formats configured to optimize a visual medium based upon at least one of capture device, resultant visual medium, and/or application-supported conditions, according to certain aspects of the disclosure. In some implementations, system 100 may include one or more computing platforms 110. Computing platform(s) 110 may be configured to communicate with one or more remote platforms 112 according to a client/server architecture, a peer-to-peer architecture, and/or other architectures. Remote platform(s) 112 may be configured to communicate with other remote platforms via computing platform(s) 110 and/or according to a client/server architecture, a peer-to-peer architecture, and/or other architectures. Users may access system 100 via remote platform(s) 112.

Computing platform(s) 110 may be configured by machine-readable instructions 114. Machine-readable instructions 114 may include one or more instruction modules. The instruction modules may include computer program modules. The instruction modules may include one or more of querying module 116, condition information receiving module 118, rule executing module 120, capture format identifying module 122, optional rule breaking module 124, capture initiation module 126, capture format invalidating module 128, and/or other instruction modules.

Querying module 116 may be configured to query a visual media capture device for at least a portion of all supported visual media capture formats. In aspects, a visual media capture format is supported by a visual media capture device if the visual media capture device is capable of capturing a visual medium in the visual media capture format given appropriate conditions and/or circumstances.

Condition information receiving module 118 may be configured to receive information regarding one or more capture device, resultant visual medium, and/or application-supported conditions relevant to capture of the resultant visual medium.

In aspects, at least one of the one or more conditions may be related to the visual media capture device. By way of non-limiting example, conditions related to the visual media capture device may include whether the visual media capture device includes an auto-focus capability, a field-of-view of the visual media capture device, and/or whether the visual media capture device supports multi-camera capture.

In aspects, at least one of the one or more conditions may be related to the resultant visual medium that may result from use of the visual media capture device. By way of non-limiting example, conditions related to the resultant visual medium that may result from use of the visual media capture device may include a resolution of the resultant visual medium, a color space for the resultant visual medium, a frame rate for the resultant visual medium (e.g., where the resultant visual medium is a video), and/or an aspect ratio of the resultant visual medium.

In aspects, at least a portion of the one or more conditions relevant to capture of the resultant visual medium are conditions supported by an application running on the visual media capture device. By way of non-limiting example, conditions supported by an application running on the visual media capture device may include a color space, frame rate, or resolution supported by the application.

Rule executing module 120 may be configured to execute an ordered plurality of rules. In aspects, the ordered plurality of rules may be ordered by priority, that is, by order of importance for the optimization of the visual medium that may result from use of the visual media capture device. In aspects, one or more of the ordered plurality of rules may be optional. In aspects, an optional rule may be a rule that may be broken and/or not followed upon the meeting of certain parameters (e.g., when execution of the ordered plurality of rules fails to result in identification of a device-supported visual media capture format that is configured to optimize a resultant visual medium, as more fully descried below).

In aspects, the rule executing module 120 may be configured to re-execute the ordered plurality of rules upon the meeting of certain parameters. By way of non-limiting example, the ordered plurality of rules may be re-executed upon a change in one or more identified capture device, resultant visual medium, and/or application-supported conditions. By way of non-limiting example, the ordered plurality of rules may be re-executed when execution of the ordered plurality of rules fails to result in at least one device-supported visual media capture format that is configured for optimizing the resultant visual medium, as more fully described below.

Capture format identifying module 122 may be configured to dynamically identify one or more device-supported visual media capture formats, of the device-supported visual media capture formats, that are configured to optimize a resultant visual medium upon execution of the ordered plurality of rules. In aspects, the capture format identifying module 122 may be configured to dynamically identify one or more device-supported visual media capture formats, of the device-supported visual media capture formats, that are configured to optimize a resultant visual medium upon re-execution of the ordered plurality of rules, for instance, when a change in one or more conditions is identified. In aspects, the capture format identifying module 122 may be configured to dynamically identify one or more device-supported visual media capture formats, of the device-supported visual media capture formats, that are configured to optimize a visual medium upon execution of the ordered plurality of rules with at least one optional rule being broken and/or not followed. In aspects, the capture format identifying module 122 may be configured to dynamically identify at least one default visual media capture format upon failure of execution or re-execution of the ordered plurality of rule to identify one or more device-supported visual capture formats that are configured to optimize a resultant visual medium.

If upon execution of the ordered plurality of rules, at least one device-supported visual media capture format of the device-supported visual media capture formats that is configured to optimize the resultant visual medium is not identified, optional rule breaking module 124 may be configured to break one or more optional rules of the ordered priority of rules until a device-supported visual media capture format that is configured to optimize the resultant visual medium is identified.

Capture initiation module 126 may be configured to cause the visual media capture device to initiate capture of a resultant visual medium using one of the one or more identified device-supported visual media capture formats that are configured to optimize a resultant visual medium.

Capture format invalidating module 128 may be configured to invalidate an identified device-supported visual media capture format. In aspects, the capture format invalidating module 126 may be configured to invalidate an identified device-supported visual media capture format upon identification of a change in a condition relevant to capture of a resultant visual medium.

In some implementations, computing platform(s) 110, remote platform(s) 112, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 130 may be operatively linked via some other communication media.

A given remote platform 112 may include one or more processors configured to execute computer program modules. The computer program modules may be configured to enable an expert or user associated with the given remote platform 112 to interface with system 100 and/or external resources 130, and/or provide other functionality attributed herein to remote platform(s) 112. By way of non-limiting example, a given remote platform 112 and/or a given computing platform 110 may include one or more of a server, a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Computing platform(s) 110 may include electronic storage 132, one or more processors 134, and/or other components. Computing platform(s) 110 may include communication lines, or ports to enable the exchange of information with a network and/or other computing platforms. Illustration of computing platform(s) 110 in FIG. 1 is not intended to be limiting. Computing platform(s) 110 may include a plurality of hardware, software, and/or firmware components operating together to provide the functionality attributed herein to computing platform(s) 110. For example, computing platform(s) 110 may be implemented by a cloud of computing platforms operating together as computing platform(s) 110.

Electronic storage 132 may comprise non-transitory storage media that electronically stores information. The electronic storage media of electronic storage 132 may include one or both of system storage that is provided integrally (i.e., substantially non-removable) with computing platform(s) 110 and/or removable storage that is removably connectable to computing platform(s) 110 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from computing platform(s) 110, information received from remote platform(s) 112, and/or other information that enables computing platform(s) 110 to function as described herein.

Processor(s) 134 may be configured to provide information processing capabilities in computing platform(s) 110. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 116, 118, 120, 122, 124, 126, and/or 128, and/or other modules. Processor(s) 134 may be configured to execute modules 116, 118, 120, 122, 124, 126, and/or 128, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 116, 118, 120, 122, 124, 126, and/or 128 are illustrated in FIG. 1 as being implemented within a single processing unit, in implementations in which processor(s) 134 includes multiple processing units, one or more of modules 116, 118, 120, 122, 124, 126, and/or 128 may be implemented remotely from the other modules. The description of the functionality provided by the different modules 116, 118, 120, 122, 124, 126, and/or 128 described below is for illustrative purposes, and is not intended to be limiting, as any of modules 116, 118, 120, 122, 124, 126, and/or 128 may provide more or less functionality than is described. For example, one or more of modules 116, 118, 120, 122, 124, 126, and/or 128 may be eliminated, and some or all of its functionality may be provided by other ones of modules 116, 118, 120, 122, 124, 126, and/or 128. As another example, processor(s) 134 may be configured to execute one or more additional modules that may perform some or all of the functionality attributed below to one of modules 116, 118, 120, 122, 124, 126, and/or 128.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
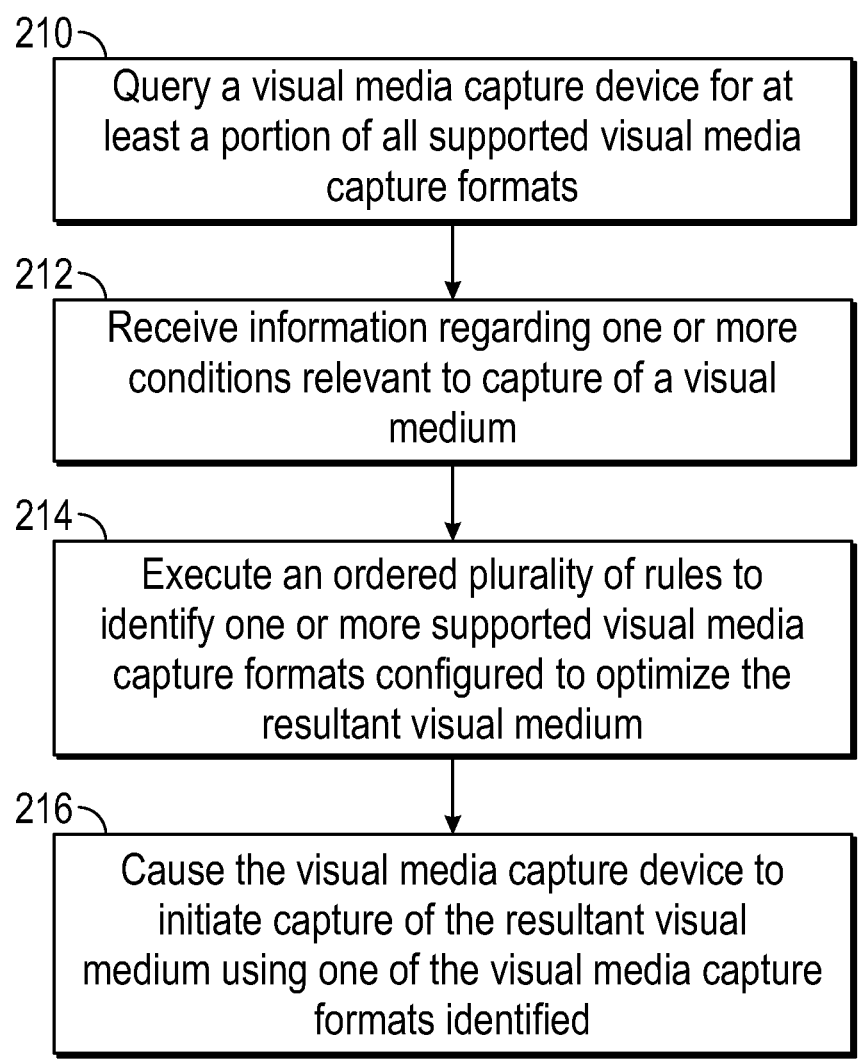
FIG. 2 illustrates an exemplary flow diagram for dynamically identifying visual media capture formats configured to optimize a resultant visual medium based upon capture device, resultant visual medium, and/or application-supported conditions, according to certain aspects of the disclosure.

FIG. 2 illustrates an exemplary flow diagram (e.g., process 200) for dynamically identifying device-supported visual media capture formats configured to optimize a resultant visual medium based upon capture device, resultant visual medium, and/or application-supported conditions, according to certain aspects of the disclosure. For explanatory purposes, the exemplary process 200 is described herein with reference to FIG. 1. Further for explanatory purposes, the steps of the exemplary process 200 are described herein as occurring in serial, or linearly. However, multiple instances of the exemplary process 200 may occur in parallel.

At step 210, the process 200 may include querying a visual media capture device for at least a portion of the device-supported visual media capture formats. In aspects, a visual media capture format is supported by a visual media capture device if the visual media capture device is capable of capturing a visual medium in the visual media capture format given an appropriate set of conditions or circumstances.

At step 212, the process 200 may include receiving information regarding one or more capture device, resultant visual medium, and/or application-supported conditions relevant to capture of the resultant visual medium. In aspects, at least one of the one or more conditions may be related to the visual media capture device. By way of non-limiting example, conditions related to the visual media capture device may include whether the visual media capture device includes an auto-focus capability, a field-of-view of the visual media capture device, and/or whether the visual media capture device supports multi-camera capture. In aspects, at least one of the one or more conditions may be related to the visual medium that may result from use of the visual media capture device. By way of non-limiting example, conditions related to the resultant visual medium may include a resolution of the resultant visual medium, a color space for the resultant visual medium, a frame rate for the resultant visual medium (e.g., where the resultant visual medium is a video), an aspect ratio of the resultant visual medium. In aspects, at least a portion of the one or more conditions relevant to capture of the resultant visual medium are conditions of an application running on the visual media capture device. By way of non-limiting example, conditions related to an application running on the visual media capture device may include a color space, a frame rate, or a resolution supported by the application.

At step 214, the process 200 may include executing an ordered plurality of rules to dynamically identify one or more device-supported visual media capture formats of the device-supported visual media capture formats that are configured to optimize the resultant visual medium. In aspects, at least one of the ordered plurality of rules is based on at least one of the one or more conditions relevant to capture of the resultant visual medium.

At step 216, the process 200 may include causing the visual media capture device to initiate capture of the resultant visual medium using one of the one or more identified device-supported visual media capture formats.

For example, at step 210, the process 200 may include querying a visual media capture device for at least a portion of the supported visual media capture formats (e.g., through querying module 116 of the system 100 of FIG. 1). At step 212, the process 200 may include receiving information regarding one or more capture device, resultant visual medium, and/or application-supported conditions relevant to capture of the resultant visual medium. (e.g., through condition information receiving module 118 of the system 100 of FIG. 1). At step 214, the process 200 may include executing (e.g., through rule executing module 120 of the system 100 of FIG. 1) an ordered plurality of rules to dynamically identify one or more device-supported visual media capture formats of the device-supported visual media capture formats that are configured to optimize the resultant visual medium. At step 216, the process 200 may include causing the visual media capture device to initiate capture of the resultant visual medium using one of the one or more identified device-supported visual media capture formats (e.g., through the capture initiation module 122 of the system 100 of FIG. 1).

Figure 3:
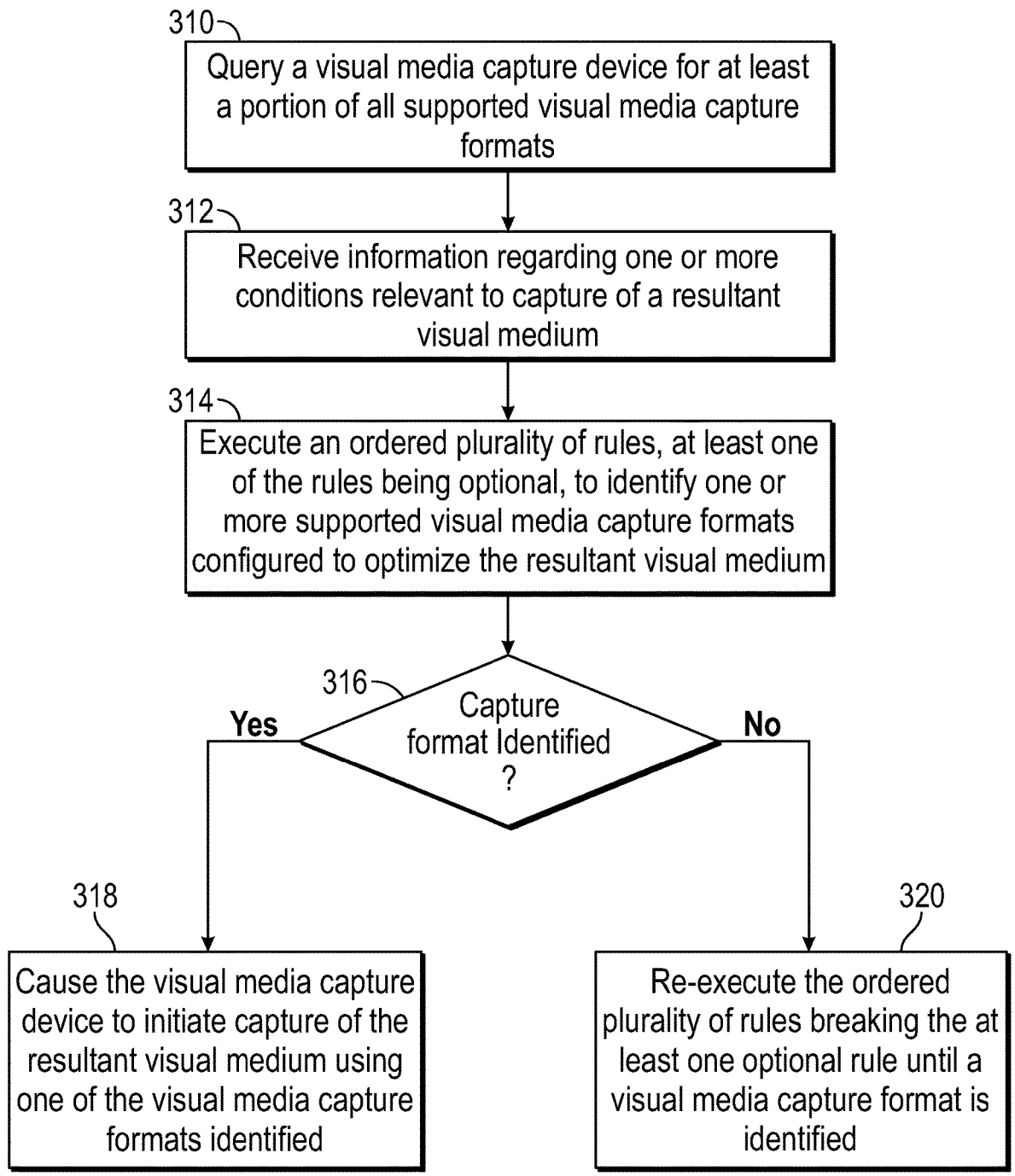
FIG. 3 illustrates an exemplary flow diagram for dynamically identifying visual media capture formats configured to optimize a resultant visual medium based upon capture device, resultant visual medium, and/or application-supported conditions, according to certain aspects of the disclosure.

FIG. 3 illustrates an exemplary flow diagram (e.g., process 300) for dynamically identifying visual media capture formats configured to optimize a resultant visual medium based upon conditions, according to certain aspects of the disclosure. For explanatory purposes, the exemplary process 300 is described herein with reference to FIG. 1. Further for explanatory purposes, the steps of the exemplary process 300 are described herein as occurring in serial, or linearly. However, multiple instances of the exemplary process 300 may occur in parallel.

At step 310, the process 300 may include querying a visual media capture device for at least a portion of the supported visual media capture formats. In aspects, a visual media capture format is supported by a visual media capture device if the visual media capture device is capable of capturing a visual medium in the visual media capture format given appropriate conditions and/or circumstances.

At step 312, the process 300 may include receiving information regarding one or more capture device, resultant visual medium, and/or application-supported conditions relevant to capture of a resultant visual medium. In aspects, at least one of the one or more conditions may be related to the visual media capture device. By way of non-limiting example, conditions related to the visual media capture device may include whether the visual media capture device includes an auto-focus capability, a field-of-view of the visual media capture device, and/or whether the visual media capture device supports multi-camera capture. In aspects, at least one of the one or more conditions may be related to the visual medium that may result from use of the visual media capture device. By way of non-limiting example, conditions related to the visual medium that may result from use of the visual media capture device may include a resolution of the resultant visual medium, a color space for the resultant visual medium, a frame rate for the resultant visual medium (e.g., where the resultant visual medium is a video), an aspect ratio of the resultant visual medium.

At step 314, the process 300 may include executing an ordered plurality of rules, at least one of the rules being optional, to identify one or more device-supported visual media capture formats that are configured to optimize the resultant visual medium.

At step 316, the process 300 may include determining whether a device-supported visual media capture format that is configured to optimize a resultant visual medium has been identified. If a device-supported visual media capture format is identified that is configured to optimize a resultant visual medium, at step 318, the process 300 may include causing the visual media capture device to initiate capture of the resultant visual medium using the identified device-supported visual media capture format that is configured to optimize the resultant visual medium.

If, at step 316, a device-supported visual media capture format that is configured to optimize a resultant visual medium is not identified, at step 320, the process 300 may include re-executing the ordered plurality of rules serially breaking the optional rule(s) until a device-supported visual media capture format configured to optimize the resultant visual medium is identified.

For example, at step 310, the process 300 may include querying a visual media capture device for at least a portion of the supported visual media capture formats (e.g., through querying module 116 of the system 100 of FIG. 1). At step 312, the process 300 may include receiving information regarding one or more capture device, resultant visual medium, and/or application-supported conditions relevant to capture of a resultant visual medium (e.g., through condition information receiving module 118 of the system 100 of FIG. 1). At step 314, the process 300 may include executing (e.g., through rule executing module 120 of the system 100 of FIG. 1) an ordered plurality of rules, at least one of the rules being optional, to identify one or more device-supported visual media capture formats configured to optimize the resultant visual medium.

At step 316, the process 300 may include determining whether a device-supported visual media capture format that is configured to optimize the resultant visual media has been identified. If a device-supported visual media capture format is identified that is configured to optimize a resultant visual medium, at step 318, the process 300 may include causing the visual media capture device to initiate capture of the resultant visual medium using the identified device-specific visual media capture format (e.g., through the capture initiation module 126 of the system 100 of FIG. 1).

If, at step 316, a device-supported visual media capture format that is configured to optimize a resultant visual medium is not identified, at step 320, the process 300 may include re-executing (e.g., through the rule executing module 120 of the system 100 of FIG. 1) the ordered plurality of rules breaking (e.g., through the optional rule breaking module 124 of the system 100 of FIG. 1) the at least one optional rule until a device-supported visual media capture format is identified.

Figure 4:
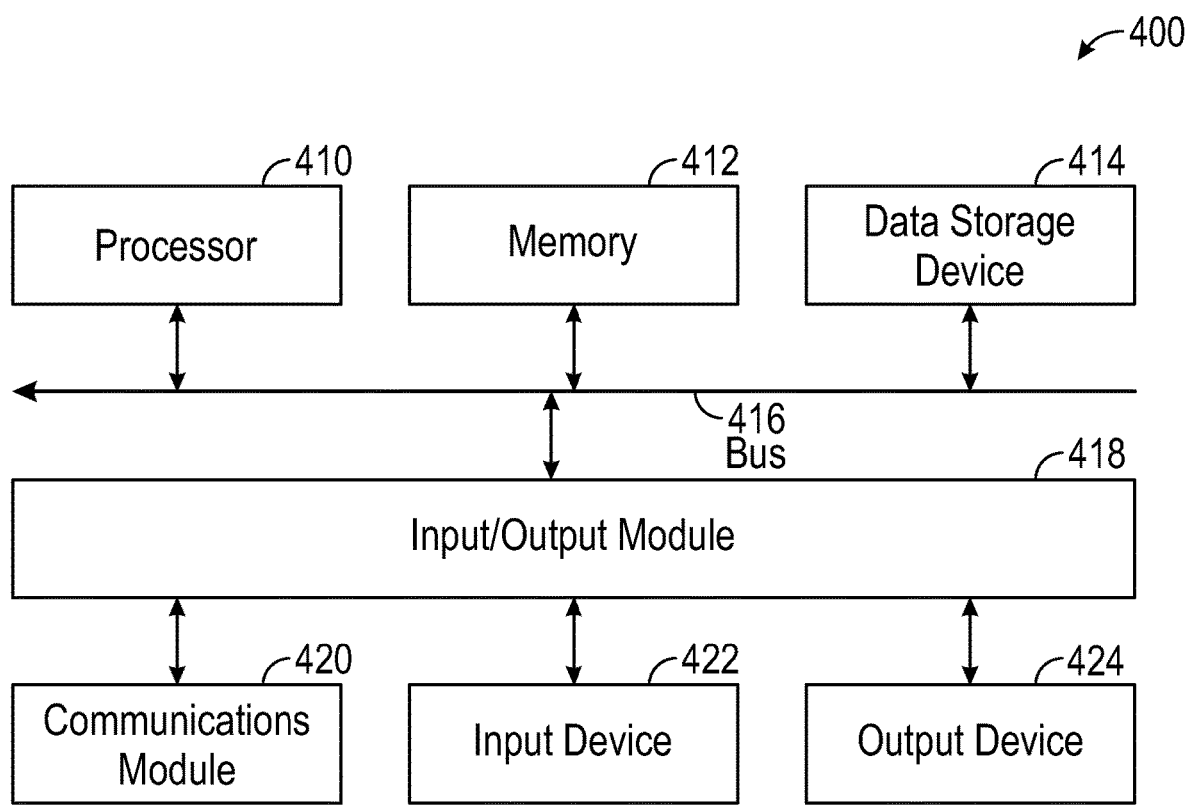
FIG. 4 is a block diagram illustrating an exemplary computer system (e.g., representing both client and server) with which aspects of the subject technology can be implemented.

FIG. 4 is a block diagram illustrating an exemplary computer system 400 with which aspects of the subject technology can be implemented. In certain aspects, the computer system 400 may be implemented using hardware or a combination of software and hardware, either in a dedicated server, integrated into another entity, or distributed across multiple entities.

Computer system 400 (e.g., server and/or client) includes a bus 416 or other communication mechanism for communicating information, and a processor 410 coupled with bus 416 for processing information. By way of example, the computer system 400 may be implemented with one or more processors 410. Processor 410 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 412, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 416 for storing information and instructions to be executed by processor 410. The processor 410 and the memory 412 can be supplemented by, or incorporated in, special purpose logic circuitry.

The instructions may be stored in the memory 412 and implemented in one or more computer program products, i.e., one or more modules of computer program instructions encoded on a computer readable medium for execution by, or to control the operation of, the computer system 400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 412 may also be used for storing temporary variable or other intermediate information during execution of instructions to be executed by processor 410.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 414 such as a magnetic disk or optical disk, coupled to bus 416 for storing information and instructions. Computer system 400 may be coupled via input/output module 418 to various devices. The input/output module 418 can be any input/output module. Exemplary input/output modules 418 include data ports such as USB ports. The input/output module 418 is configured to connect to a communications module 420. Exemplary communications modules 420 include networking interface cards, such as Ethernet cards and modems. In certain aspects, the input/output module 418 is configured to connect to a plurality of devices, such as an input device 422 and/or an output device 424. Exemplary input devices 422 include a keyboard and a pointing device, e.g., a mouse or a trackball, by which a user can provide input to the computer system 400. Other kinds of input devices 422 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 424 include display devices such as a LCD (liquid crystal display) monitor, for displaying information to the user.

According to one aspect of the present disclosure, the above-described gaming systems can be implemented using a computer system 400 in response to processor 410 executing one or more sequences of one or more instructions contained in memory 412. Such instructions may be read into memory 412 from another machine-readable medium, such as data storage device 414. Execution of the sequences of instructions contained in the main memory 412 causes processor 410 to perform the process steps described herein. One or more processors in a multi-processing arrangement may also be employed to execute the sequences of instructions contained in memory 412. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 418 for execution. Such a medium may take many forms, including, but not limited to, non-volatile media, volatile media, and transmission media. Non-volatile media include, for example, optical or magnetic disks, such as data storage device 414. Volatile media include dynamic memory, such as memory 412. Transmission media include coaxial cables, copper wire, and fiber optics, including the wires that comprise bus 416. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 400 reads game data and provides a game, information may be read from the game data and stored in a memory device, such as the memory 412. Additionally, data from the memory 412 servers accessed via a network the bus 416, or the data storage 414 may be read and loaded into the memory 412. Although data is described as being found in the memory 412, it will be understood that data does not have to be stored in the memory 412 and may be stored in other memory accessible to the processor 418 or distributed among several media, such as the data storage device 414.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for dynamically identifying a visual media capture format that is configured to optimize a resultant visual medium based upon conditions, the method comprising:
    querying a visual media capture device for at least a portion of device-supported visual media capture formats;
    receiving information regarding one or more capture device, resultant visual medium, or application-supported conditions that are relevant to capture of the resultant visual medium;
    executing an ordered plurality of rules to dynamically identify one or more device-supported visual media capture formats of the device-supported visual media capture formats, the one or more identified device-supported visual media capture formats being configured to optimize the resultant visual medium; and
    causing the visual media capture device to initiate capture of the resultant visual medium using one of the one or more identified device-supported visual media capture formats.

2. The computer-implemented method of claim 1,
    wherein receiving information regarding one or more device-supported, resultant visual medium, or application-supported conditions comprises receiving information regarding one or more device-supported conditions,
    and wherein the one or more device-supported conditions include whether the visual media capture device include an auto-focus capability, a field-of-view of the visual media capture device, and whether the visual media capture device supports multi-camera capture.

3. The computer-implemented method of claim 1,
    wherein receiving information regarding one or more device-supported, resultant medium, or application-supported conditions comprises receiving information regarding one or more resultant visual medium conditions,
    and wherein the one or more resultant visual medium conditions include a resolution of the resultant visual medium, a color space for the resultant visual medium, a frame rate for the resultant visual medium, and an aspect ratio of the resultant visual medium.

4. The computer-implemented method of claim 1,
    wherein receiving information regarding one or move device-supported, resultant visual medium, or application-supported conditions comprises receiving information regarding one or more application-supported conditions, and wherein the one or more application-supported conditions include a color space, frame rate, and a resolution supported by an application running on the visual media capture device.

5. The computer-implemented method of claim 1, wherein one or more of the ordered plurality of rules is an optional rule.

6. The computer-implemented method of claim 5, wherein if upon execution of the ordered plurality of rules at least one visual media capture format of the device-supported visual media capture formats that is configured to optimize the resultant visual medium is not identified, the method further comprises:
re-executing the ordered plurality of rules breaking the one or more optional rules until a visual media capture format of the device-supported visual media capture formats that is configured to optimize the resultant visual medium is identified.

7. The computer-implemented method of claim 6, wherein if upon re-execution of the ordered plurality of rules at least one visual media capture format of the supported visual media capture formats configured to optimize the resultant visual medium is not identified, the method further comprises:
identifying a default resultant visual media capture format of the device-supported visual media capture formats.

8. The computer-implemented method of claim 1, further comprising:
receiving information that at least one of the one or more capture device, resultant visual medium or application-supported conditions relevant to capture of the resultant visual medium has changed;
based upon receiving the information that at least one of the one or more capture device, resultant visual medium, or application-supported conditions relevant to capture of the resultant visual medium has changed, invalidating the identified device-supported visual media capture format of the device-supported visual media capture formats that is configured to optimize the resultant visual medium;
re-executing the ordered plurality of rules to dynamically identify a second one or more device-supported visual media capture formats of the device-supported visual media capture formats that is configured to optimize the resultant visual medium; and
causing the capture device to initiate capture of the resultant visual medium using one of the second one or more identified device-supported visual media capture formats.

9. The computer-implemented method of claim 1, wherein at least a portion of the one or more capture device, resultant visual medium, or application-supported conditions relevant to capture of the resultant visual medium are directed to one of a resolution of the resultant visual medium, auto-focus of the visual media capture device, a color space for the resultant visual medium, a frame rate for the resultant visual medium, a field-of-view of the visual media capture device, an aspect ratio of the resultant visual medium; and a multiple-camera feature of the visual media capture device.

10. A system configured for dynamically identifying a visual media capture format that is configured to optimize a resultant visual medium based upon conditions, the system comprising:
one or more hardware processors configured by machine-readable instructions to:
query a visual media capture device for at least a portion of supported visual media capture formats;
receive information regarding one or more capture device, resultant visual medium, or application-supported conditions relevant to capture of the resultant visual medium;
execute an ordered plurality of rules to dynamically identify one or more device-supported visual media capture formats of the device-supported visual media capture formats that is configured to optimize the resultant visual medium; and
cause the visual media capture device to initiate capture of the resultant visual medium using one of the one or more identified device-supported visual media capture formats.

11. The system of claim 10,
wherein at least a portion of the one or more capture device, resultant visual medium, or application-supported conditions relevant to capture of the resultant visual medium are conditions of the visual media capture device,
and wherein the one or more visual media capture device conditions include whether the visual media capture device includes an auto-focus capability, a field-of-view of the visual media capture device, and whether the visual media capture device supports multi-camera capture.

12. The system of claim 10,
wherein at least a portion of the one or more capture device, resultant visual medium, or application-supported conditions relevant to capture of the resultant visual medium are conditions of an application running on the visual media capture device,
and wherein the one or more application-supported conditions include a color space, frame rate, and a resolution supported by an application running on the visual media capture device.

13. The system of claim 10,
wherein at least a portion of the one or more capture device, resultant visual medium, and application-supported conditions include one or more resultant visual medium conditions,
and wherein the one or more resultant visual medium conditions include a resolution of the resultant visual medium, a color space for the resultant visual medium, a frame rate for the resultant visual medium, and an aspect ratio of the resultant visual medium.

14. The system of claim 10, wherein one or more of the ordered plurality of rules is an optional rule.

15. The system of claim 14, wherein if upon execution of the ordered plurality of rules at least one visual media capture format of at least the portion of the device-supported visual media capture formats that is configured to optimize the resultant visual medium is not identified, the one or more hardware processors are further configured by machine-readable instructions to:
re-execute the ordered plurality of rules breaking the one or more optional rules until a device-supported visual media capture format of the device-supported visual media capture formats that is configured to optimize the resultant visual medium is identified.

16. The system of claim 15, wherein if upon re-execution of the ordered plurality of rules at least one device-supported visual media capture format of the device-supported visual media capture formats that is configured to optimize the resultant visual medium is not identified, the one or more hardware processors are further configured by machine-readable instructions to:
  identify a default device-supported visual media capture format of the device-supported visual media capture formats.

17. The system of claim 10, wherein the one or more hardware processors are further configured by machine-readable instructions to:
  receive information that at least one of the one or more capture device, resultant visual medium, or application-supported conditions relevant to capture of a resultant visual medium has changed;
  based on receipt of the information that at least one of the one or more capture device, resultant visual medium, or application-supported conditions relevant to capture of a resultant visual medium has changed, invalidate the identified device-supported visual media capture format of the device-supported visual media capture formats that is configured to optimize the resultant visual medium; and
  re-execute the ordered plurality of rules to dynamically identify a second one or more device-supported visual media capture formats of the device-supported visual media capture formats that is configured to optimize the resultant visual medium; and
  cause the visual media capture device to initiate capture of the resultant visual medium using one of the second one or more identified device-supported visual media capture formats.

18. The system of claim 10, wherein at least a portion of the one or more capture device, resultant visual medium, or application-supported conditions relevant to capture of the visual medium are directed to one of a resolution of the resultant visual medium, auto-focus of the visual media capture device, a color space for the resultant visual medium, a frame rate for the resultant visual medium, a field-of-view of the visual media capture device, an aspect ratio of the resultant visual medium; and a multiple-camera feature of the visual media capture device.

19. A non-transient computer-readable storage medium having instructions embodied thereon, the instructions being executable by one or more processors to perform a method for dynamically identifying a visual media capture format configured to optimize a resultant visual medium based upon conditions, the method comprising:
  querying a visual media capture device for at least a portion of supported visual media capture formats;
  receiving information regarding one or more capture device, resultant visual medium, or application-supported conditions relevant to capture of the resultant visual medium;
  executing an ordered plurality of rules to dynamically identify one or more device-supported visual media capture formats of the device-supported visual media capture formats that is configured to optimize the resultant visual medium; and
  causing the visual media capture device to initiate capture of the resultant visual medium using one of the one or more identified device-supported visual media capture formats.

20. The computer readable-storage medium of claim 19, wherein one or more of the ordered plurality of rules is an optional rule,
  and wherein if upon execution of the ordered plurality of rules at least one device-supported visual media capture format of the device-supported visual media capture formats that is configured to optimize the resultant visual medium is not identified, the method further comprises:
  re-executing the ordered plurality of rules breaking the one or more optional rules until a device-supported visual media capture format of the device-supported visual media capture formats that is configured to optimize the resultant visual medium is identified.

* * * * *